United States Patent [19]

Gagas

[11] Patent Number: 4,632,150
[45] Date of Patent: Dec. 30, 1986

[54] WATER CONDITIONER ROTARY VALVE

[75] Inventor: John M. Gagas, Milwaukee, Wis.

[73] Assignee: Erie Manufacturing Co., Milwaukee, Wis.

[21] Appl. No.: 775,447

[22] Filed: Sep. 12, 1985

[51] Int. Cl.⁴ .................. F16K 11/06; B01D 35/00
[52] U.S. Cl. ..................... 137/625.46; 137/625.29; 210/278; 210/190
[58] Field of Search ............... 137/625.46, 625.29, 137/625.31, 625.21, 625.15; 251/356, 357; 210/190, 278

[56] References Cited

U.S. PATENT DOCUMENTS

| | | | |
|---|---|---|---|
| 3,123,096 | 3/1964 | Notaro et al. | 251/368 |
| 3,863,675 | 2/1975 | Witshire | 137/625.29 |
| 4,210,532 | 7/1980 | Loke | 137/625.29 |

Primary Examiner—Martin P. Schwadron
Assistant Examiner—John S. Starsiak, Jr.

Attorney, Agent, or Firm—Andrus, Sceales, Starke & Sawall

[57] ABSTRACT

A water conditioner rotary valve (18) is substantially formed of plastic and designed to provide fluid type valving without requiring gaskets or precision forming of valve elements while operating in a highly efficient manner by reducing shear stress and rotative friction. The valve seat (100) has a series of raised ribs (105, 105') on both sides (103, 104) to provide a sealing engagement against a substantially planar surface (84) of a housing plate member (80) and against a substantially planar surface (119) of a rotor assembly (115). The rotor assembly (115) features a valving plate member (116) interconnected to a ported cover (117) through interlocking butterfly shaped ridges and grooves (129, 140, 132, 143) to substantially reduce rotative shear stress while further providing fluid channels (150, 151) to provide selected fluid flow paths through the rotary valve (18) in response to the selective alignment of the rotor assembly (115).

1 Claim, 17 Drawing Figures

WATER CONDITIONER ROTARY VALVE

TECHNICAL FIELD

This invention relates to a rotary valve for a water conditioner.

BACKGROUND ART

For many years, rotary valve structures have been connected to control an automatic water softener of the type including a bed which is periodically backwashed and then regenerated with brine withdrawn from a brine compartment or tank formed either as a part of the softener itself or as a separate unit. Many of such water conditioning systems include complicated valving to provide multiple functions such as service, backwash, brine, rinse and flushing of the system.

One known system is constructed as a closure to the open upper end of a mineral tank and functions in conjunction with a brine tank to provide a service mode, a backwash mode, a brine mode, a slow rinse mode and a rapid rinse and brine tank refill mode. The valve assembly in such system is motor driven in response to a timing mechanism associated therewith to enable automatic cycling of the valve assembly through the various modes, as disclosed in U.S. Pat. No. 4,210,532 issued on July 1, 1982, to Harvey L. Loke.

However, the disclosure of Loke is in fact only applicable to valves manufactured by conventional machining processes involving non-ferrous cast, forged or bar stock materials. Flatness specifications necessary for sealing surfaces require machining and lapping operations on these materials to maintain a minimum tolerance of 0.0004 inch to assure proper function. Both the material and the processing required are economically contrary to market requirements for cost competitive products. Additionally the electromechanical power requirements needed for rotary actuation against the relatively large area of sealing surface presented by the Loke valve only magnifies the problem of cost efficiency.

Other art relating to multiple port rotary type valves is disclosed in U.S. Pat. No. 2,451,678 issued on Oct. 19, 1984, to Bruce W. Johnson et al; U.S. Pat. No. 3,863,675 issued on Feb. 4, 1975, to Arthur J. Wiltshire; and Great Britain Pat. Specification No. 1,504,281 published Mar. 15, 1978, for inventor Ian Cooper.

Both the Johnson et al and Wiltshire patents address purely mechanical, hand-operated lift-and-turn structures. These non-automated valves are neither desired by the vast majority of the water conditioning market, nor is it economically feasible to impliment this complex actuation motion to automate its operation. Sealing members disclosed are completely without merit when considering simple and economic rotary shear action across the sealing surface. In other words, the tubular gaskets of Johnson et al and the gasket ribs of Wiltshire would be sheared off if used with rotary action valves of the Loke type instead of the lift-and-turn valves for which they were designed.

The Cooper disclosure reveals an effective seal surface pattern when applied to a rotary sealing member. However, as in the Loke disclosure, valve construction must rely on the costly non-ferrous materials and machining operations to achieve tolerance specifications necessary to effect bypass leak proof seals necessary for water conditioning control valves. Pointedly the Cooper disclosure makes no reference to seal composition or sealing function requirements.

U.S. Pat. No. 3,233,732 to Kenneth R. Lung et al discloses a water softening system employing a rotary valve wherein a spring urges a valve rotor made of phenolic resin against a valve plate which includes a rubber backup member and a wear resistant, self-lubricating, non-corrosive face plate preferably of polytetrafluoroethylene bonded thereto for sealing engagement with the rotor valve.

U.S. Pat. No. 3,470,151 to Lester O. Hegstad discloses a water softener rotary valve which employs a Belleville spring to urge a circular shaped planar face of a hollow rotor which is coated with polytetrafluoroethylene into tight sealing engagement with a circular shaped planar face of a stationary valve member cast of brass.

U.S. Pat. No. 3,123,096 discloses the use of a self-lubricating material such as polytetrafluoroethylene filled with glass, molybdenum disulfide, carbon or fine rouge in oxygen compressor feather valves.

BRIEF SUMMARY OF THE INVENTION

The invention relates to a water conditioning rotary valve. The main objective of this invention is to provide an electromechanical water conditioning rotary valve utilizing standard plastic and elastomer molding techniques to effect a low cost, economically competitive valve control which captures the simplicity and high performance flow characteristics inherent in a rotary valve design.

A seat member includes a surface having a plurality of fluid apertures therein which are each surrounded by a raised rib to form a valve seat. A rotor member provides a plurality of fluid openings in a substantially planar surface which engages the raised rib of the seat member. The raised rib is compressed into engagement with the substantially planar surface while the rotor member containing the planar surface is rotated to provide continuous sliding engagement between the raised rib and the substantially planar surface to form a fluid tight seal when a selected opening is aligned with a selected aperture.

The raised rib takes up manufacturing tolerance deviations in flatness of the substantially planar surface and reduces the compressive force necessary for maintaining a fluid tight seal between the raised rib and the substantially planar surface. This reduction of compressive force also reduces the force required to rotate the member containing the planar surface. Fluid conduits are provided to communicate with the apertures and openings to provide a fluid flow path established by the selective alignment of a selected aperture with a selected opening.

The raised rib is preferrably integrally molded on a surface of the seat member, and includes first and second radially spaced annular members and a plurality of circumferentially spaced radial members so that each aperture is surrounded by a pair of adjacent radial members and arc segments of the first and second annular members. The valve seat member is composed of an elastomeric material, and is impregnated or coated with molybdenium disulfide or graphite which reduces sliding friction when engaging the substantially planar surface.

The rotor member and its substantially planar surface is molded of a plastics type material using conventional molding techniques. The use of the raised rib in continuous sliding engagement with a substantially planar surface has been found to provide a fluid tight seal in spite of tolerance deviations in the substantially planar surface normally encountered with conventional molding techniques. The use of such construction permits high pressure fluid flows through the valving ports of molded plastic without incurring leakage. Such construction further eliminates gaskets, O-rings and the like at the valve ports which frequently become worn out and must be replaced.

The valve body assembly is also made out of a plastics material and also includes a substantially planar surface providing a plurality of spaced fluid passageways. The side of the seat member opposite the rotor member contains a second raised rib which surrounds the plurality of fluid apertures and engages the substantially planar surface of the valve body to form a fluid tight seal between the aligned passageways and apertures with the second rib also permitting a deviation in flatness of the second substantially planar surface and a reduction of compressive force between the second rib and the second substantially planar surface. The second raised rib is configured of first and second radially spaced annular members and a plurality of circumferentially spaced radial members whereby each aperture is surrounded by adjacent radial members and arc segments of the first and second annular members. The valve seat member and the plastic valve body assembly provide an interlocking tab and groove to maintain the apertures in alignment with the passageways.

The rotor member includes a valve plate member providing the plurality of fluid openings communicating between first and second sides with the first side engaging the valve seat member and a cover member connected to the second side to rotate the valve plate member. One of the valve plate and cover members of the rotor assembly provides a laterally extending groove while the other member provides a laterally extending ridge which inter-engage to transmit rotary force from the cover member to the valve plate member with a reduction of rotative stress on the members. In operation, the cover member of the rotor assembly is rotated to selectively align a selected aperture with a selected opening.

The valve plate member of the rotor assembly includes a butterfly shaped configuration which has corresponding butterfly shaped ridges and grooves which mate with similarly configured ridges and grooves of the cover member.

The cover member of the rotor assembly features an axial opening and a pair of oppositely spaced radially extending channels to provide fluid communication between the axial opening and a pair of openings provided in the valve plate member. A plurality of circumferentially spaced radially extending projections on the cover member are engaged to receive rotative force for rotating the rotor assembly.

The construction and operation of the water conditioner rotary valve features many additional novel features as will be made apparent by the claims, the drawings and the description thereof.

BRIEF DESCRIPTION OF THE PREFERRED EMBODIMENT

Figure 1:
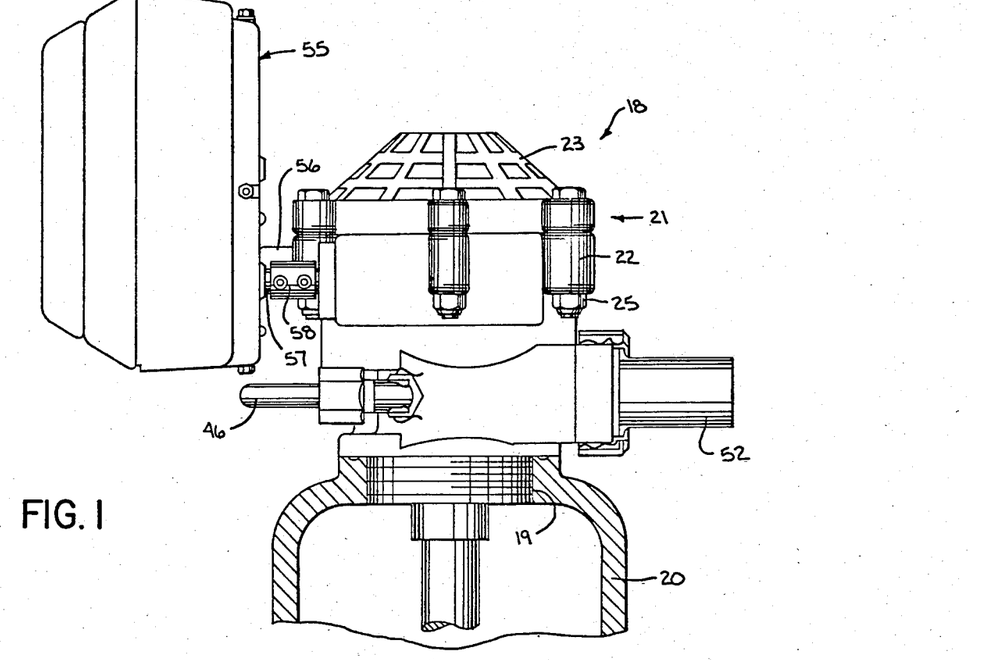
FIG. 1 is a side view of a portion of a water conditioning system including a water conditioner rotary valve assembly.
Figure 2:
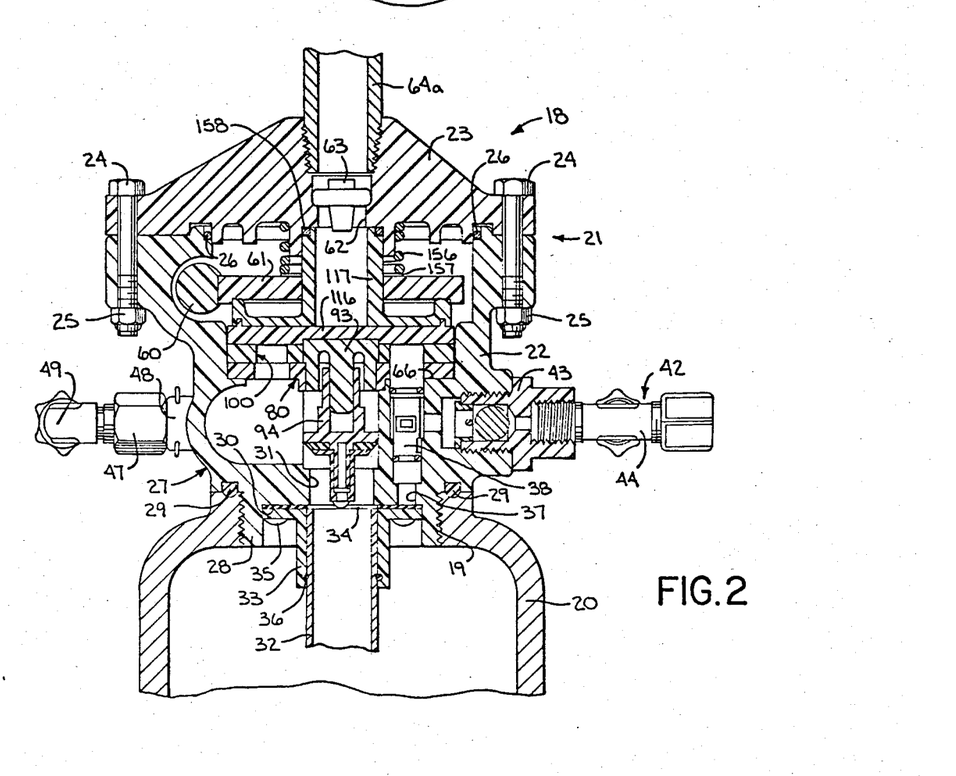
FIG. 2 is a front sectioned view of a portion of the water conditioner system of FIG. 1.
Figure 3:
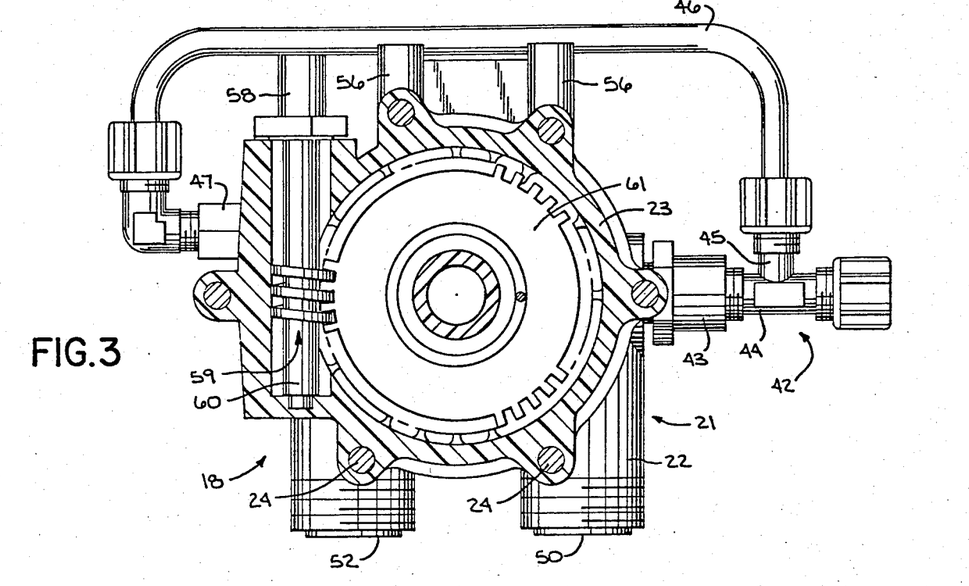
FIG. 3 is a top view of the water conditioner rotary valve of FIG. 1.
Figures 4, 12:
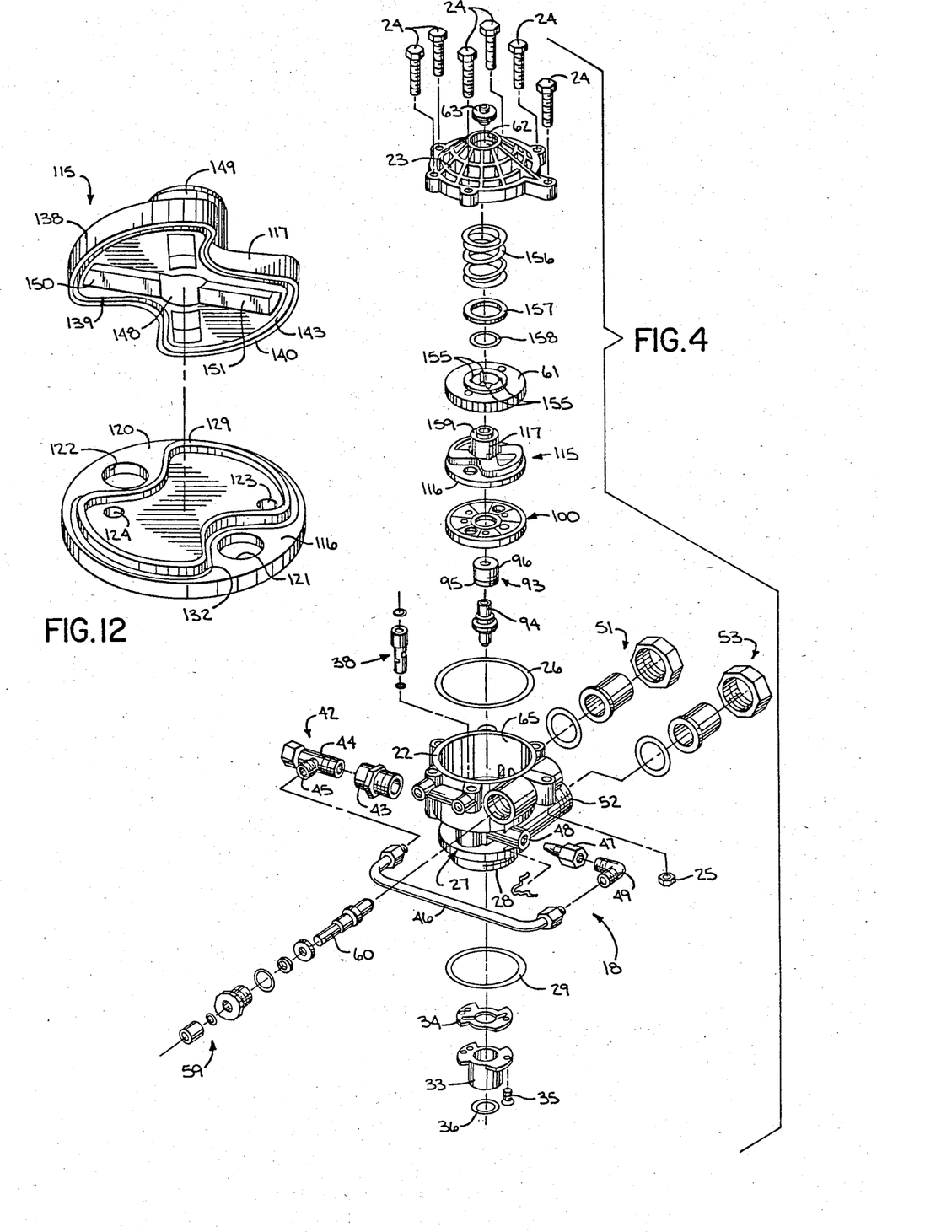
FIG. 4 is an exploded view illustrating a number of parts for the water conditioner rotary valve of FIGS. 1-3.
FIG. 12 is an exploded perspective view showing the top of the lower member and the bottom of the upper member of the rotor assembly of FIG. 10.

A water conditioner rotary valve 18 is secured to a threaded opening 19 of a water softener mineral tank 20. The rotary valve 18 includes a housing assembly 21 including a molded plastic base member (lower housing) 22 secured to a molded plastic cover member (upper housing) 23 through a series of bolts 24 and securing nuts 25. An O-ring 26 provides a fluid seal between the base member 22 and the cover member 23. A lower end 27 of base member 22 provides an externally threaded annular projection 28 which is secured to tank 20 via the external threads 19. An O-ring 29 provides a seal between tank 20 and the base member 22.

A bottom surface 30 of base member 22 contains a series of openings or passageways to provide fluid flow between the mineral tank 20 and the rotary valve 18. For example, a central opening 31 in the base member 22 communicates with a stand pipe 32 which is interconnected through a riser insert 33, gasket 34, securing screws 35 and an O-ring 36. Another opening 37 contains an injector assembly 38 which, in turn, is coupled for fluid communication with the top of tank 20.

A brine flow conduit 42 is connected through a brine line (not shown) to a brine tank (not shown), such as illustrated in FIG. 8 in the Loke U.S. Pat. No. 4,210,532. The brine conduit 42 includes a check valve assembly 43 and a T-coupling 44 having a lateral output 45 connected to a drain tube 46. A brine flow control 47 is secured to a brine port 48 of base member 22 and is further connected to the drain tube 46 through an elbow fitting 49. The base member 22 further provides a laterally extending input port 50 including the tube retaining insert members 51 and an outlet port 52 including the tube retaining insert members 53.

A timer and motor assembly 55 is mounted to a pair of mounting projections 56 provided by the base member 22. An output shaft 57 of a drive motor (not shown) located within assembly 55 is connected through a coupler 58 to selectively rotate a worm gear assembly 59 including a worm gear member 60 coupled through suitable gear teeth to rotate a worm wheel 61.

The cover member 23 includes a central opening 62 containing a back wash flow control valve 63 and communicates with a drain line 64a.

Figure 5:
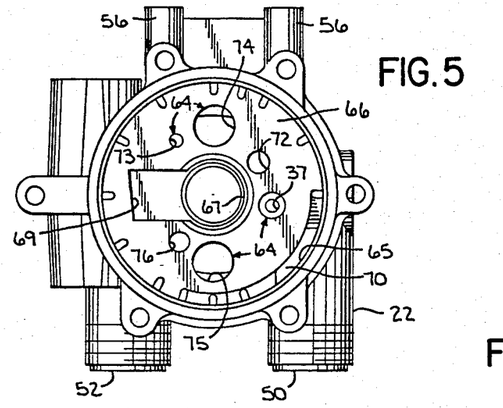
FIG. 5 shows an axial planar view into a valve housing assembly of the rotary valve assembly of FIG. 1.

The base member 22 provides an internal cavity 65 which includes a surface 66 having a series of openings 64 therein. For example, an axial opening 67 includes the lower end 31 which communicates with the stand pipe 32. A key slot opening 69 communicates with the outlet port 52. A circumferential arc shaped opening 70 communicates with the inlet port 50. The opening 37 contains the injector assembly 38 which, in turn, communicates with the brine conduit 42. An opening 73 is coupled to the drain tube 46. The openings 72, 74, 75 and 76 communicate with the top of the mineral tank 20. It is understood that any number of openings may be placed in surface 66 of base member 22 to effectuate any sequence that may be desired.

Figure 6:
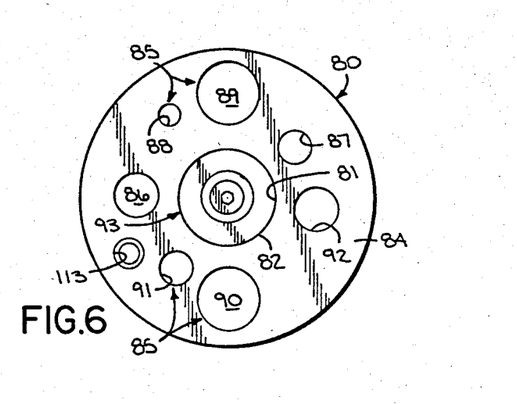
FIG. 6 is a top view of a disc-shaped plate of the valve housing assembly.

The housing assembly 21 further includes a bottom plate 80 which provides a cylindrically shaped disc having a central opening 81 containing internal threads 82. The opposite sides 83 and 84 are substantially planar. A series of ports 85 communicate between surfaces 83 and 84 and generally conform to the openings 64 provided by the surface 66 of base member 22. Specifically, the port 86 is aligned with the key slot opening 69, the port 87 is aligned with opening 72. The port 88 is aligned with opening 73, the port 89 is aligned with opening 74, the port 90 is aligned with opening 75, the port 91 is aligned with opening 76, while the port 92 is aligned with opening 37. The bottom plate 80 may, if desired, be secured to surface 66 by an adhesive such as acrylic cement so that bottom plate 80 may function substantially as an integral member of the lower housing or base member 22. If desired, the bottom plate 80 and the base member 22 could be molded as a unitary unit.

A plug 93 movably retains a float assembly 94 for axial movement within the opening 31 and contains external threads 95 to be secured to the internal threads 82 provided by the bottom plate 80. An upper portion 96 of plug 93 forms an alignment projection as will be described in greater detail hereafter.

Figure 7:
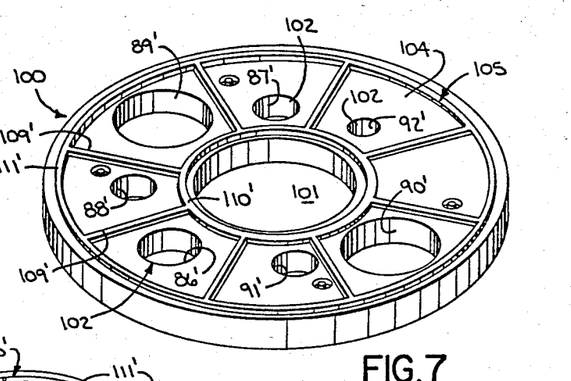
FIG. 7 is a perspective view of a valve seat used in the rotary valve of FIGS. 1-3.
Figures 8, 10, 11, 13, 14:
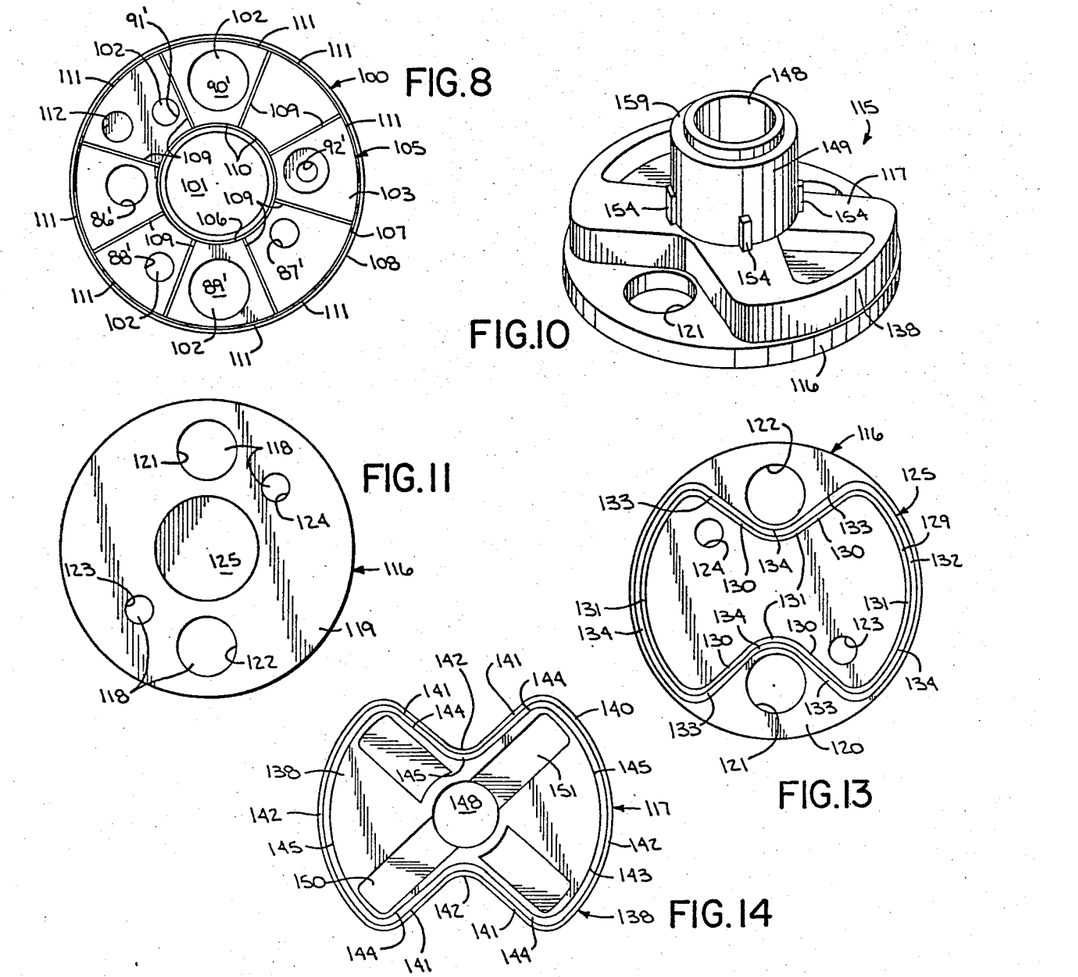
FIG. 8 is a bottom axial view of the valve seat of FIG. 7.
FIG. 10 is a perspective view of the rotor assembly used in the rotary valve of FIGS. 1-3.
FIG. 11 is a bottom axial view of a lower plate member of the rotor assembly of FIG. 10.
FIG. 13 is a top axial view of the lower member of the rotor assembly of FIG. 10.
FIG. 14 is a bottom axial view of the upper member of the rotor assembly of FIG. 10.
Figure 9:
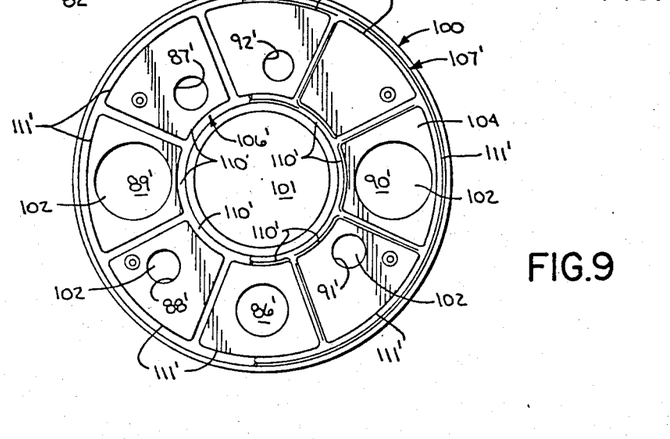
FIG. 9 is a top axial view of the valve seat of FIG. 7.

A valve seat 100 is a disc-shaped member molded of an elastomeric material having a central circular opening 101. The valve seat 100 includes a series of apertures 102 which extend between a pair of oppositely disposed substantially planar surfaces 103 and 104. The apertures 102 in valve seat member 100 correspond to the ports 85 in bottom plate 80 so that apertures 102 which communicate with ports 85 will be identified with identical numbers primed. The surface 103 includes an integral raised rib 105 which surrounds each of the apertures 102. Specifically, the raised rib 105 includes an inner annular raised rib 106 located adjacent to the central opening 101 and a radially spaced annular raised rib 107 which is located adjacent to a circumferential outer edge 108 of the valve seat member 100. The annular raised ribs 106 and 107 are joined by a series of circumferentially spaced radial ribs 109. In such manner, adjacent radial ribs 109 are joined to a series of circumferential arc segments 110 of the inner annular rib 106 and a series of circumferential arc segments 111 of the outer annular rib 107 to form a fluid tight seat about an enclosed aperture 102 when engaged against the substantially planar surface 84 of the bottom plate 80. The elastomeric material for valve seat 100 and rib 105 may be a nitro-rubber compound such as "Buna-N" with a preferred hardness of 90 durometer as measured on the Shore scale. Other elastomeric materials may also be used. However, if the composition's hardness falls below about 85 durometer, rib 105 becomes too soft and does not form an adequate long term seal because of its compression set characteristics. On the other hand, if the composition's hardness is above about 95 durometer, rib 105 becomes too hard and isn't sufficiently compressed to form an adequate seal.

A locating slot 112 in surface 103 mates with a locating projection 113 provided by bottom plate 80 to provide alignment of apertures 102 with ports 85 to permit fluid flow therethrough.

The oppositely disposed substantially planar surface 104 of the valve seat member 100 provides a raised rib construction which is virtually identical as previously described with respect to the surface portion 103 so that like elements will be identified by identical numbers primed and further discussion thereof is deemed unnecessary.

A rotor assembly 115 includes a valving plate member 116 and a ported cover 117. The plate member 116 includes a plurality of passageways 118 which communicate between a plate first side 119 and an oppositely disposed plate second side 120. Specifically, a pair of passageways 121 and 122 are circumferentially spaced by approximately 180° to be oppositely spaced from each other. Further, a pair of passageways 123 and 124 are likewise circumferentially spaced by approximately 180° to be oppositely spaced with respect to each other and are also circumferentially spaced from passageways 121 and 122. The plate member 116 is molded of a plastic type material and the surface 119 is substantially planar within tolerances provided by conventional molding processes. A center opening 125 in plate member 116 engages the alignment projection 96 of plug 93. The side 119 of plate member 116 is impregnated or coated with graphite to reduce sliding friction with valve seat 100 and plug 93.

The side 120 of plate member 116 includes a butterfly shaped ridge and groove configuration 128. Specifically, a butterfly shaped ridge 129 includes a series of laterally extending ridges 130 which are joined by connecting ridges 131 to provide a continuous ridge structure having a butterfly type shape. A butterfly shaped groove 132 is located immediately adjacent to the butterfly shaped ridge 129 and likewise includes a series of laterally extending grooves 133 which are joined by connecting grooves 134 to form a continuous groove of a butterfly configuration.

The ported cover 117 includes a butterfly shaped end 138 which provides a butterfly shaped ridge and groove configuration 139. Specifically, a butterfly shaped ridge 140 includes a series of laterally extending ridges 141 which are joined by connecting ridges 142 to provide a continuous ridge of butterfly configuration which seats within the butterfly shaped groove 132 of plate member 116. A butterfly shaped groove 143 is located immediately adjacent to the butterfly shaped ridge 140 and includes a series of laterally extending grooves 144 which are joined by connecting grooves 145 to provide the continuous groove 143 which seats with the butterfly shaped ridge 129 provided by the plate member 116. The interlocking connection of ridges 129 and 140 with grooves 143 and 132, respectively, provide a secure inter-connection between the ported cover 117 and the valving plate member 116. If desired, an adhesive can be added to the interlocking ridges and grooves to enhance the inter-connection, or the parts can be bonded using ultrasonic welding. Of particular importance, the interlocking of the laterally extending grooves 133 and 144 with the laterally extending ridges 141 and 130, respectively, substantially reduce the rotative stress between the ported cover 117 and the plate member 116 when the ported cover 117 is driven to rotate the plate member 116. For a maximum reduction in rotative shear stress, it is desirable to form the laterally extending ridges and grooves as close as possible to the radial direction to maximize a reduction in shear stress. With such construction, the rotative stress is absorbed by the ridge and groove inter-connection rather than by adhesives alone as found in past constructions.

The ported cover 117 includes an axially directed channel 148 which extends through the butterfly shaped end 138 through an oppositely disposed barrel shaped end 149. A pair of oppositely spaced laterally extending channels 150 and 151 communicate with opening 148 and are located within the butterfly shaped ridge and groove configuration 139 to form a fluid connection between passageways 123 and 124 and axial opening 148.

A series of circumferentially spaced radially extending projections 154 extend outwardly from the barrel shaped end 149 of the ported cover 117 and are engaged by circumferentially spaced slots 155 provided by worm wheel 61.

Figure 15:
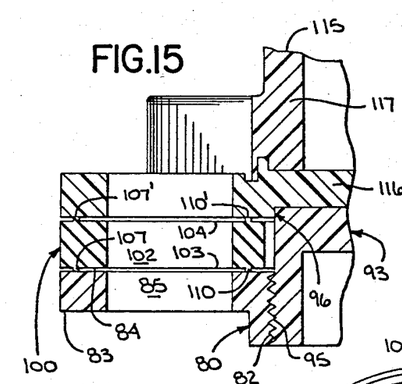
FIG. 15 is a sectional view with parts broken away illustrating the inter-connection of the valve seat with the rotor assembly and the bottom plate of the housing assembly.

A spring 156 is connected to worm wheel 61 through a washer 157 and is directly connected to the cover member 23. An O-ring 158 is seated in an annular slot 159 of the barrel shaped end 149 of the ported cover 138 to provide a seal against the cover member 23. When assembled, the spring 156 bears against the worm wheel 61 to thereby compress the rotor assembly 115 into firm engagement with the valve seat 100. In such manner, the valve seat 100 is compressed in a sandwiched relationship between the valving plate member 116 and the housing plate 80.

Figure 16:
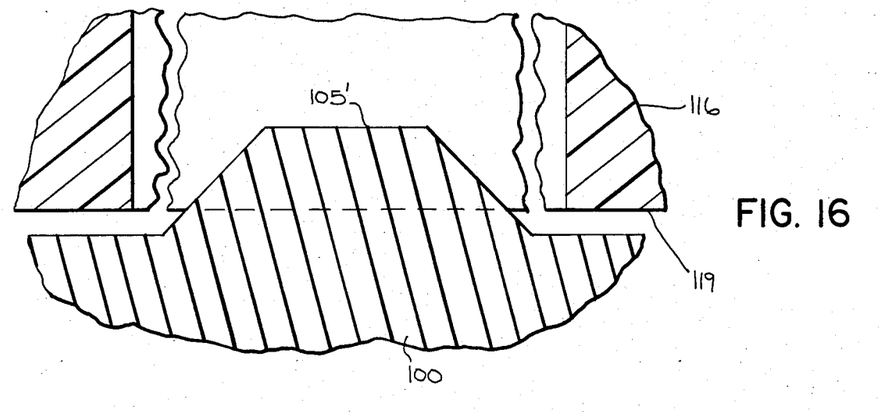
FIG. 16 is an enlarged fragmentary cross sectional view in detail illustrating a raised rib on the valve seat of FIG. 7 and the bottom surface of the lower plate member of the rotor assembly of FIG. 10.
Figure 17:
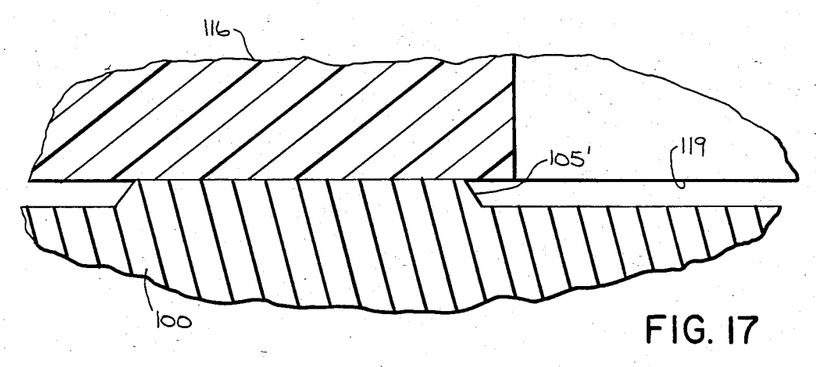
FIG. 17 is an enlarged fragmentary cross sectional view similar to FIG. 16 illustrating the lower plate member rotated to a position wherein the rib of FIG. 16 is compressed to form a seal.

Referring to FIGS. 16 and 17, FIG. 16 shows raised rib 105' in its uncompressed state projecting into one of the openings in lower plate member 116 of rotor assembly 115. Rib 105' is about 0.010-0.011 inches high in its uncompressed state. FIG. 17 illustrates that raised rib 105' slidably engages the substantially planar surface 119 of the lower plate member 116 of rotor assembly 115 to provide a fluid tight seal when a selected passageway 118 of rotor assembly 115 is substantially aligned with a selected aperture 102 of the valve seat 100. The sides of rib 105' are inclined at an angle of about 45° to aid in reducing the shear forces on rib 105' when plate member 116 is rotated. When compressed as shown in FIG. 17, rib 105' is only about 0.002-0.003 inches high. In operation, the raised rib 105' takes up tolerance deviations found in conventional molding techniques for the flatness of the surfaces of valving plate member 116 and the valve seat 100, which are typically 0.004 to 0.008 inches, to provide a fluid tight seal. Such construction substantially reduces cost by eliminating the need for special gaskets and/or a virtually planar surface 119 of plate member 116. The raised rib 105' further provides a fluid tight seal with a lesser compressive force by spring member 156 which, in turn, reduces the amount of torque required to turn worm gear assembly 59 thereby resulting in a need for a smaller drive motor. The impregnation or coating of graphite or molybdenium disfulfide to surface 119 of rotor assembly 115 and to the raised rib 105' of valve seat 100 reduces sliding friction and increases efficiency of the rotary valve. The butterfly construction of the rotor assembly 115 reduces shear forces between the valving plate member 116 and the ported cover 117 while further providing special porting for fluid flow therethrough.

Various modes of carrying out the invention are contemplated as being within the scope of the following claims which particularly point out and distinctly claim the subject matter which is regarded as the invention.

I claim:

1. A water conditioner rotary valve to be mounted to the open top of a mineral tank, comprising a plastic valve body assembly having an inlet port, an outlet port, a brine port, a drain port and a substantially planar surface providing a series of circumferentially spaced passageways communicating with a lower opening into said mineral tank as well as said outlet, brine and drain ports, a disc-shaped elastomeric seat member providing a series of apertures aligned with said circumferentially spaced passageways and communicating between first and second sides of said seat member with each side including in integral raised rib surrounding each of said apertures, each raised rib including first and second radially spaced annular members and a plurality of circumferentially spaced radial members whereby each aperture is surrounded by a pair of adjacent radial members and arc segments of said first and second annular members to form a valve seat for each of said apertures with said rib on said second side engaging said substantially planar surface of said valve body assembly to form a fluid tight seal therewith, said valve body and said seat member providing an interlocking tab and groove to maintain said apertures of said seat member in alignment with said circumferentially spaced passageways of said body assembly, a rotary plastic rotor assembly including a disc-shaped valve plate member providing a series of openings communicating between first and second sides of said valve plate member including first and second oppositely and circumferentially spaced openings operatively connected to communicate with said inlet port and third and fourth oppositely and circumferentially spaced openings with said first and second openings circumferentially spaced from said third and fourth openings and said first valve plate member side providing a substantially planar surface to slidably engage said raised rib provided by said seat member first side to form a fluid tight seal with a selected aperture of said seat member in substantial alignment with one of said first through fourth openings of said valve plate member to permit fluid flow through a substantial alignment of said port and aperture and openings without leakage and said second valve plate member side providing a butterfly shaped groove adjacent to a butterfly shaped ridge surrounding said third and fourth openings and a cover member having an axial opening operatively communicating with said drain port and extending from a barrel shaped first end to a butterfly shaped second end having a butterfly shaped groove surrounded by a butterfly shaped lip to snugly engage said butterfly shaped ridge and said butterfly shaped groove, respectively, of said disc-shaped valve plate member to permit said disc-shaped valve plate member to rotate in unison with said cover member with minimal shear forces therebetween and said second end providing a pair of oppositely spaced radially extending channels to provide fluid communication between said third and fourth openings and said axial opening with said barrel shaped first end providing a series of circumferentially spaced radially extending projections, drive means engaging said projections on said cover member first end to positively rotate said cover member and said valve plate member in unison to selectively align selected openings of said valve plate member with selected apertures in said seat member to provide a desired fluid flow through said rotary valve, and spring means operatively connected to compress said valve plate member into firm engagement with said seat member and to maintain said seat member in firm sandwiched relationship between said valve plate member and said substantially planar surface provided by said body assembly.

* * * * *